(12) United States Patent
Boulos et al.

(10) Patent No.: US 12,368,654 B2
(45) Date of Patent: Jul. 22, 2025

(54) OPTIMIZING NETWORK SLICES USING SERVICE PROFILE AGGREGATION

(71) Applicant: Ciena Corporation, Hanover, MD (US)

(72) Inventors: Logaina Michel Ramzy Boulos, St. Laurent (CA); Fadi Bishay, Laval (CA); Hesham Sedky, Vaudreuil-Dorion (CA)

(73) Assignee: Ciena Corporation, Hanover, MD (US)

( * ) Notice: Subject to any disclaimer, the term of this patent is extended or adjusted under 35 U.S.C. 154(b) by 434 days.

(21) Appl. No.: 17/592,574

(22) Filed: Feb. 4, 2022

(65) Prior Publication Data

US 2023/0254223 A1 Aug. 10, 2023

(51) Int. Cl.
*H04L 41/5009* (2022.01)
*H04W 28/06* (2009.01)

(52) U.S. Cl.
CPC ......... *H04L 41/5009* (2013.01); *H04W 28/06* (2013.01)

(58) Field of Classification Search
CPC ............................ H04L 41/5009; H04W 28/06
See application file for complete search history.

(56) References Cited

U.S. PATENT DOCUMENTS

| | | | | |
|---|---|---|---|---|
| 11,190,413 | B1* | 11/2021 | Priya | H04L 41/5045 |
| 11,954,999 | B2* | 4/2024 | Parzysz | H04W 12/06 |
| 2017/0142591 | A1* | 5/2017 | Vrzic | H04W 76/12 |
| 2017/0332421 | A1* | 11/2017 | Sternberg | H04W 12/069 |
| 2018/0132138 | A1* | 5/2018 | Senarath | H04L 41/0813 |
| 2021/0105628 | A1 | 4/2021 | Bishay et al. | |
| 2021/0258221 | A1* | 8/2021 | Young | H04L 41/082 |
| 2022/0141095 | A1* | 5/2022 | Beeram | H04L 41/0895 370/254 |
| 2022/0353138 | A1* | 11/2022 | Wyszkowski | H04L 41/5045 |
| 2023/0284127 | A1* | 9/2023 | Gautam | H04L 41/5048 370/328 |

* cited by examiner

*Primary Examiner* — Nicholas R Taylor
*Assistant Examiner* — Angela Widhalm De Rodriguez
(74) *Attorney, Agent, or Firm* — Baratta Law PLLC; Lawrence A. Baratta, Jr.

(57) ABSTRACT

Systems and methods include receiving a request for a slice, in a network, with the request having requirements defining a Service Profile; determining if there are any existing slice instances in the network that are created for an Aggregate Service Profile having similar requirements; responsive to the Aggregate Service Profile having similar requirements, modifying the Aggregate Service Profile to include the Service Profile and one or more additional Service Profiles; and executing the modified Aggregate Service Profile in the network. The Aggregate Service Profile combines the requirements from multiple Service Profiles and consolidates them into one Profile that conforms with a Standard Slice Template as well as the multiple Service Profiles allocated therein.

20 Claims, 6 Drawing Sheets

OPTIMIZING NETWORK SLICES USING SERVICE PROFILE AGGREGATION

FIELD OF THE DISCLOSURE

The present disclosure generally relates to networking. More particularly, the present disclosure relates to systems and methods for optimizing network slices using service profile aggregation.

BACKGROUND OF THE DISCLOSURE 5G is more than a set of standards for next-generation wireless networking. Rather, 5G includes aspects of wireless and wireline network integration. One key aspect of 5G is network slicing which allows operators to split a single physical network into multiple virtual networks. Thus, operators deploy one single physical infrastructure and partition networks virtually using network slicing. Network slicing technology enables operators to provide networks on an as-a-service basis, which enhances operational efficiency while reducing time-to-market for new services. A network slice could span across multiple parts of the network (e.g., terminal, access network, core network, and transport network) and could also be deployed across multiple operators. A network slice includes dedicated and/or shared resources, e.g., in terms of processing power, storage, and bandwidth and has isolation from the other network slices. Slice types could be defined from a functional, operational, or behavioral perspective.

In an operational network, there will be slices added and removed continually. 5G network slicing across management components is achieved by complete stateless orchestration which means that any optimization (reallocation and modification) is decided based on the state of the network and the new request intent only. This leads to poor reallocation since only when the new request is perfectly matching the runtime state of an existing slice that this slice can be reused. This will lead to failing to reuse a slice in most cases, as the new Service Layer Agreement (SLA) requirements would normally be different with each new request—would lead each time to having a new independent slice created with dedicated resources. This approach requests way too much network resources. Moreover, it does not utilize the full capacity of the network resources, thus creating redundancy and higher service costs

BRIEF SUMMARY OF THE DISCLOSURE

The present disclosure relates to systems and methods for optimizing network slices using service profile aggregation. The present disclosure ensures efficient and scalable network slicing given that existing slicing approaches cannot ensure each slice has enough resources to meet the service specifications while being correctly isolated from external interference. The present disclosure allows dynamic allocation and reutilization of slices in order to guarantee the SLA and maximize the sharing and reutilization of resources. In order to allow these resources to fulfill more concurrent parallel connections, the present disclosure matches slices and communication service requests. Specifically, we implement a live monitoring process to track all SLAs currently used for all the individual slices, calculates the remaining capacity by implementing an aggregator mechanism that was used to create the slice, and dynamically modify profiles of existing slices in order to address the summation of multiple communication needs. To achieve that, our design decouples the communication service from the slice requirement and assigns the maximum denominator for the slices while making sure that we are not ending up with a super slice that grabs all resources.

The present disclosure includes a separation between the request intent(s) "Service Profile" from the executable "Aggregate Profile," while maintaining a continuous association between them and a direct inheritance for all of them with the Catalog Template (Service Spec). This concept revolves around three anchors:

1) Adding a new service: Comparing the new set of requirements with all previous requirements. Hence assuring maximum reusability with minimal upscale of network and compute resources.
2) Reacting to network performance: When network assurance data informs that certain Slice Key Performance Indicators (KPIs) are breached, the corrective course of action is not calculated based on the Slice Instance intended SLAs only. But instead, it is processed against each Service Profile that contributed to this Slice Instance for optimal yet minimal adjustments
3) Removing an existing service: Revertive behavior, where algorithm is re-calculating the Aggregate Service profile with new optimal target KPIs for the slice, based on remaining Service Profiles.

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. The steps include receiving a request for a slice, in a network, with the request having requirements defining a Service Profile; determining if there are any existing slice instances in the network that are created for an Aggregate Service Profile having similar requirements; responsive to the Aggregate Service Profile having similar requirements, modifying the Aggregate Service Profile to include the Service Profile and one or more additional Service Profiles; and executing the modified Aggregate Service Profile in the network.

The steps can further include, responsive to having no existing slice instances in the network that are created for an Aggregate Service Profile having similar requirements, creating a new Aggregate Service Profile; and executing the new Aggregate Service Profile in the network. The steps can further include determining service requirements for a slice instance associated with the Aggregate Service Profile in the network require remediation; and modifying the Aggregate Service Profile. The steps can further include, responsive to a request to remove an existing service in the Aggregate Service Profile, removing a Service Profile associated with the existing service; modifying the Aggregate Service Profile with the Service Profile removed; and executing the modified Aggregate Service Profile in the network.

All Service Profiles consolidated in the Aggregate Service Profile can have a same Standard Slice Template. The similar requirements can be based on a Standard Slice Template. The requirements can include any of latency, bandwidth, and a combination thereof. The Aggregate Service Profile can combine the requirements from multiple Service Profiles and consolidates them into one Profile that conforms with a Standard Slice Template as well as the multiple Service Profiles allocated therein.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
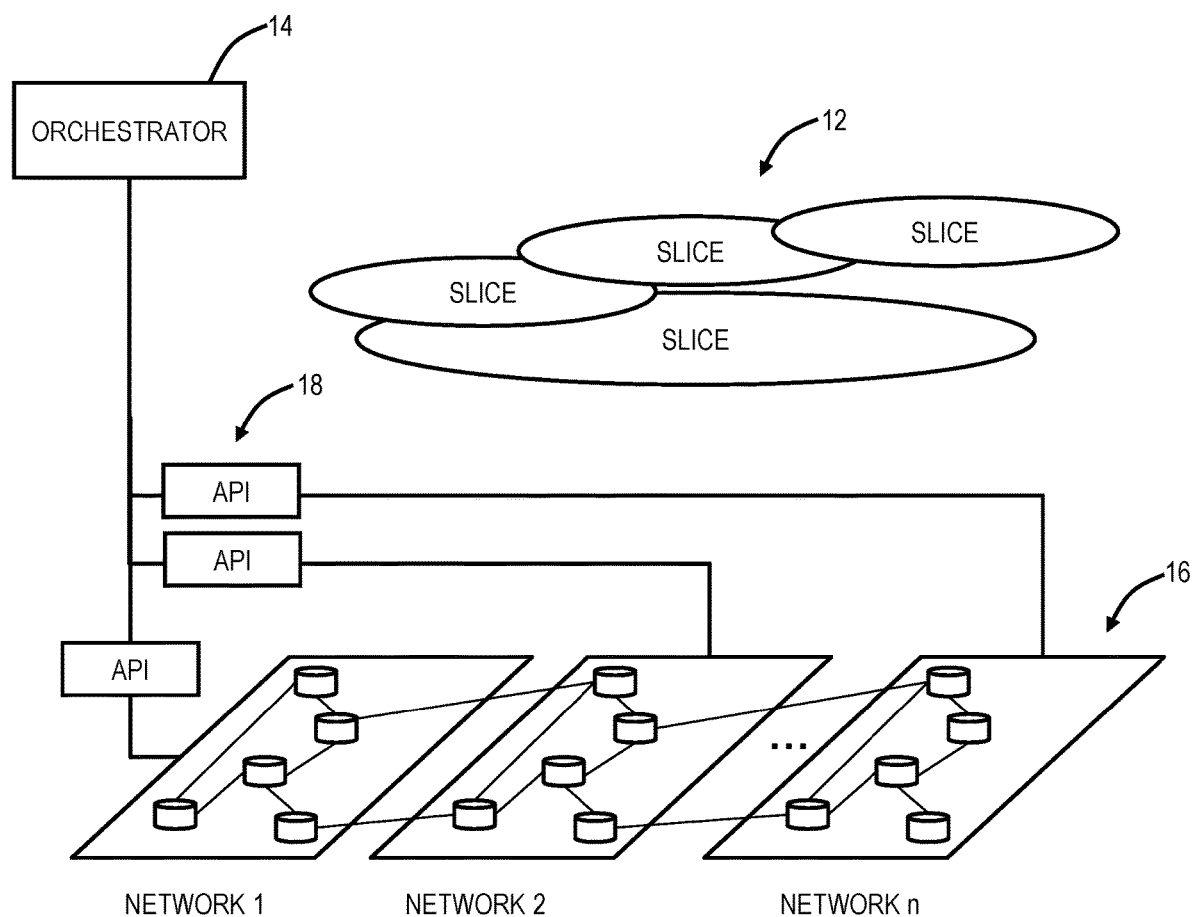
FIG. 1 is a network diagram of a network illustrating network slices and an orchestrator.

Again, the present disclosure relates to systems and methods for optimizing network slices using service profile aggregation. The present disclosure ensures efficient and scalable network slicing given that existing slicing approaches cannot ensure each slice has enough resources to meet the service specifications while being correctly isolated from external interference. The present disclosure allows dynamic allocation and reutilization of slices in order to guarantee the SLA and maximize the sharing and reutilization of resources. In order to allow these resources to fulfill more concurrent parallel connections, the present disclosure matches slices and communication service requests. Specifically, we implement a live monitoring process to track all SLAs currently used for all the individual slices, calculates the remaining capacity by implementing an aggregator mechanism that was used to create the slice, and dynamically modify profiles of existing slices in order to address the summation of multiple communication needs. To achieve that, our design decouples the communication service from the slice requirement and assigns the maximum denominator for the slices while making sure that we are not ending up with a super slice that grabs all resources.

The present disclosure includes a separation between the request intent(s) "Service Profile" from the executable "Aggregate Profile," while maintaining a continuous association between them and a direct inheritance for all of them with the Catalog Template (Service Spec). This concept revolves around three anchors:

1) Adding a new service: Comparing the new set of requirements with all previous requirements. Hence assuring maximum reusability with minimal upscale of network and compute resources.
2) Reacting to network performance: When network assurance data informs that certain Slice Key Performance Indicators (KPIs) are breached, the corrective course of action is not calculated based on the Slice Instance intended SLAs only. But instead, it is processed against each Service Profile that contributed to this Slice Instance for optimal yet minimal adjustments
3) Removing an existing service: Revertive behavior, where algorithm is re-calculating the Aggregate Service profile with new optimal target KPIs for the slice, based on remaining Service Profiles Network Slices 5G networks are about deploying, managing and enabling new innovative service offerings in a timely, highly cost-effective manner without compromising the quality of service or experience of customers. It must be adaptable, dynamic and programmable. It must address the cost, efficiency, and flexibility requirements dictated by the market that does not anymore accept a one-size-fits-all approach. 5G networks will have to be managed in an automated and orchestrated manner from a service provisioning perspective.

Orchestration will require multi-domain and multi-vendor management support. 5G networks rely on network slicing algorithms to create logical networks on top of a commonly shared physical infrastructure. Each virtual network (network slice) is designed to support a particular use case and is thus defined as a collection of an independent set of logical network functions that support the requirement of a particular set of use cases. It provides the resources and topology needed for the specific service. A key requirement here is to prevent any slice from interfering with the traffic of another slice. Therefore, the key challenge when designing a network slice is to ensure the creation of secure, firmly isolated virtual networks, each of which serves a different use case for a certain user, tenant, or application.

But building a firmly isolated virtual network does not mean that network resources need to be dedicated for each specific slice. Throughout our research we came to develop some allocation, reallocation, and optimization techniques that will allow network resources to be shared and reused across multiple slices while still guaranteeing the isolated characteristic of each slice and its resources.

FIG. 1 is a network diagram of a network 10 illustrating network slices 12 and an orchestrator 14. The network 10 includes one or more networks 16, which can include physical network elements, virtual network elements, and combinations thereof supporting network, compute, and/or storage resources. For illustration purposes, FIG. 1 includes different networks 1, 2, . . . , n. The network slices 12 are services provisioned on the network, compute, and/or storage resources, via the corresponding network elements, across the networks 16. Again, the network slices 12 can span across multiple parts of the network 10 (e.g., terminal, access network, core network, and transport network) and could also be deployed across multiple operators/service providers, i.e., the networks 16. The network slices 12 can include dedicated and/or shared resources, e.g., in terms of processing power, storage, and bandwidth and has isolation from the other network slices. Slice types could be defined from a functional, operational, or behavioral perspective. The orchestrator 14 can be a processing apparatus, such as illustrated in FIG. 9. The orchestrator 14 can communicate with the networks 16 and the corresponding network elements via Application Programming Interfaces (APIs) 18.

Each slice 12 will be completely isolated so that no slice 12 can interfere with the traffic in another slice 12. Each will be configured with its own network architecture, engineering mechanism, and network provisioning. It will typically contain management capabilities, which may be controlled by the network operator or the customer depending on the use case. It will be independently managed and orchestrated, via the orchestrator 14.

Figure 2:
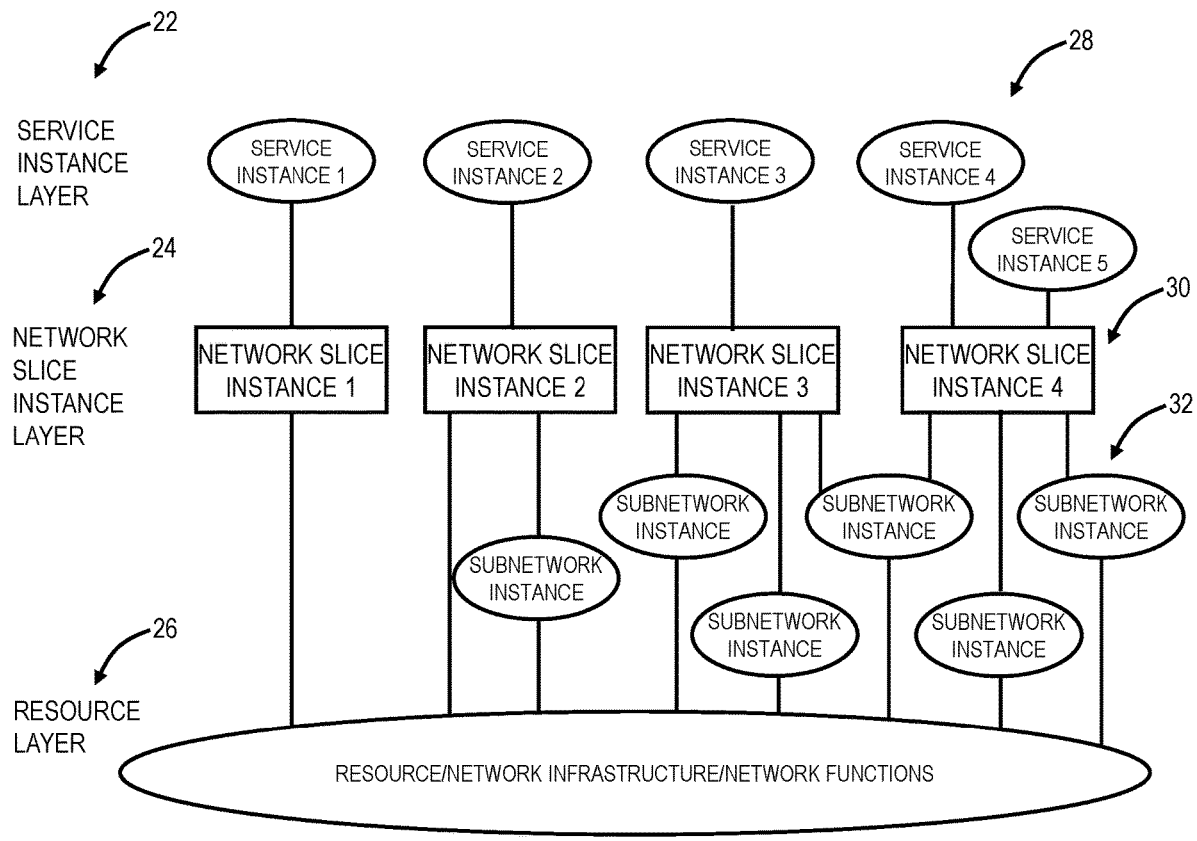
FIG. 2 is a diagram of an information model for network slices.

FIG. 2 is a diagram of an information model 20 for the network slices 12. The information model 20 can be a two-level model with a service instance layer 22 and a network slice instance layer 24, that controls a resource layer 26. As described herein, the information model (which may also be referred to as an object model, information model, etc.) includes computer data in a specified structure. The computer data is used to maintain and manage configurations of the resource layer 26, which corresponds to the network elements in the networks 16. That is, the computer data is used to program and configure the physical hardware or virtual functions associated with the networks 16. The resource layer 26 and the network elements can include any type of network, compute, and/or storage device, such as, without limitation, switches, routers, optical transport, wireless terminals, storage, servers, etc.

The information model 20 includes service instances 28, network slice instances 30, and sub-network instances 32, of the resource layer 26.

Definitions

A network slice 12 is a logical network that provides specific network capabilities and network characteristics. The network slice 12 can be a managed group of subsets of resources, network functions/network virtual functions at the data, control, management/orchestration planes, and services at a given time. The network slice 12 is programmable and has the ability to expose its capabilities. The behavior of the network slice 12 is realized via network slice instance(s).

A resource in the resource layer 26 is a physical or virtual (network, compute, and/or storage) component available within a system. Resources can be very simple or finegrained (e.g., a port or a queue) or complex, such as including multiple resources (e.g., a network device, network element, etc.).

A Network Function (NF) is a processing function in a network. It includes, but is not limited to, network nodes functionality, e.g., session management, mobility management, switching, routing functions, which has defined functional behavior and interfaces. Network functions can be implemented as a network node on dedicated hardware or as a virtualized software functions. Data, control, management, orchestration planes functions are Network Functions.

A Virtual Network Function (VNF) is a network function whose functional software is decoupled from hardware. One or more virtual machines running different software and processes on top of industry-standard high-volume servers, switches, and storage, or cloud computing infrastructure, and capable of implementing network functions traditionally implemented via custom hardware appliances and middleboxes (e.g., router, NAT, firewall, load balancer, etc.).

A network element is defined as a manageable, logical entity uniting one or more network devices. This allows distributed devices to be managed in a unified way using one management system. It also means a facility or equipment used in the provision of a communication service. Such term also includes features, functions, and capabilities that are provided by means of such facility or equipment, including subscriber numbers, databases, signaling systems, and information sufficient for billing and collection or used in the transmission, routing, or other provision of a telecommunications service.

A service instance 28 is an instance of an end-user service or a business service that is realized within or by a network slice 12. Each service is represented by a service instance 28. Services and service instances would be provided by the network operator or by third parties.

A network slice instance 30 is a set of network functions and the required resources (e.g., compute, storage, and networking resources) which form a deployed network slice 12. A network slice instance 30 is an activated network slice 12. It is created based on a network slice template, a set of managed run-time network functions, and resources to run these network functions, forming a complete instantiated logical network to meet certain network characteristics required by the service instance(s). It provides the network characteristics that are required by a service instance. A network slice instance may also be shared across multiple service instances provided by the network operator. The network slice instance may be composed by none, one or more sub-network instances, which may be shared by another network slice instance.

A network slice template is a complete description of the structure, configuration, and the plans/workflows for how to instantiate and control the network slice instance during its life cycle.

A 5G super slice: a 5G specific entity that is used to expose all 5G related catalog entries. It contains templates (catalog entries) for all 3GPP defined slice types. Each template represents the slide type SLAs as defined by the 3GPP standards. Those templates exist in the 5G scope only and are not accessible from the outside.

An Application Slice is a construct that enables a network slice. It holds all the network resources needed as well as all the SLA requirements to fulfil this slice instance.

A Service Specification is a catalog entry definition that defines the SLA boundaries of each standard slice template. For every 3GPP service slice template, a catalog entry is created and assigned to the 5G super slice. This way it becomes part of the catalog that is specific to only the resources and constraints of a specific slice using it to constraint the policy of this slice and for the context of a single service and using it to instantiate this service. That means this Service Specification is the vehicle for orderable services within the constraints of the slice where it resides.

Super Slice

The 5G super slice is used as a catalog for all available 5G related services. For each different 5G slice template, a Service Specification is available representing that specific slice type together with all its SLAs and network requirements. These Service Specifications can be used as the starting point for any new slice request. To capture the user defined requirements, we introduced a second level of inheritance, one that describes the service profile itself. This service profile combines both the slice template SLA but also all the user specific requirements. It inherits from the selected catalog template of the requested slice type. This inheritance makes sure that the newly created service profile abides to the constraints of the parent slice type template and therefore ensuring that the new user request exists only within its boundaries.

Figure 3:
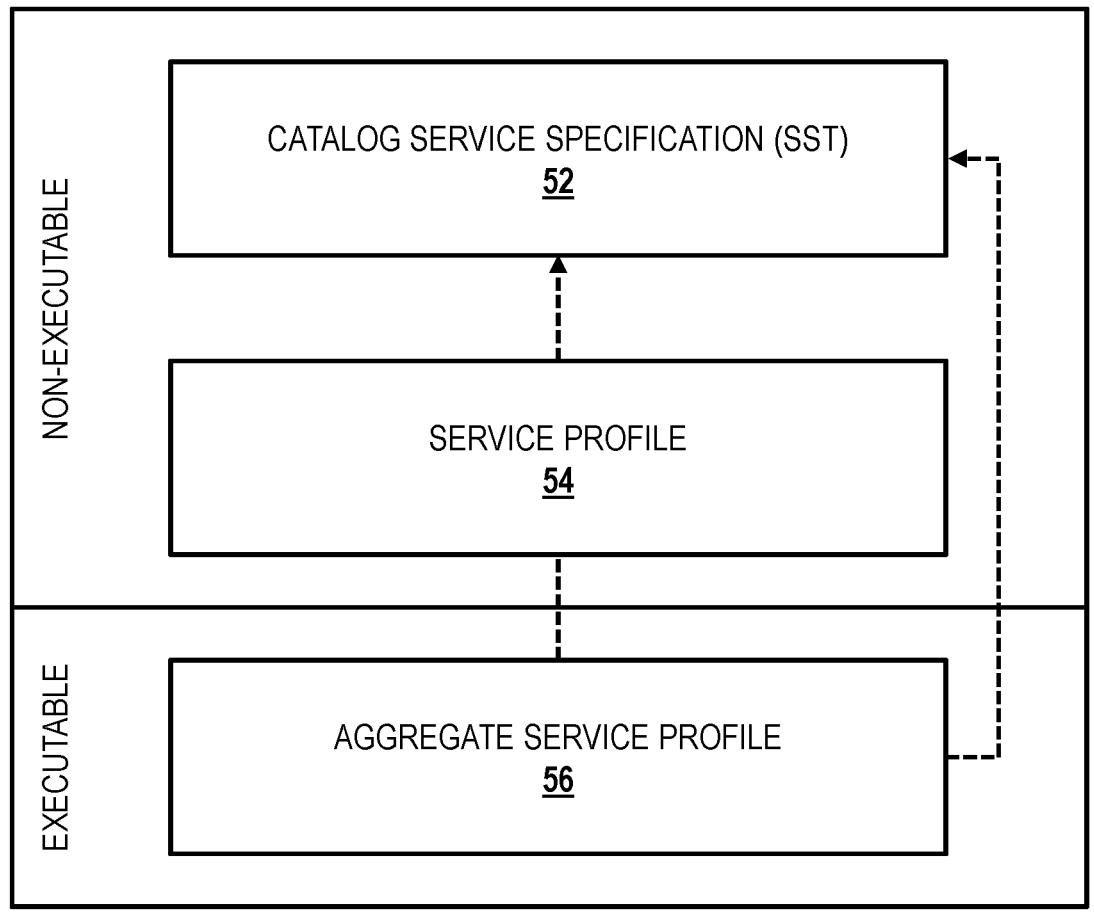
FIG. 3 is a block diagram that shows a multi-level composition of a Service Specification.

FIG. 3 is a block diagram that shows a multi-level composition of a Service Specification 50. A Catalog Service Specification 52 describes the Standard Slice Template (SST). It defines the constraints of the model within the slice type. This Service Spec is not executable and serves only to define, per catalog selection, the boundary of the slice.

A Service Profile 54 inherits from the SST and is used to fully qualify the target profile of the service. Here lies all the user specific requirements for the slice. Those requirements are bound by the SLAs defined by the parent SST and cannot go beyond its characteristics. However, user input can add further constraints to the slice. This Service Profile 54 is again not executable.

An Aggregate Service Profile 56 also inherits from the SST and initially replicates the Service Profile 54 it is created from. It serves as an executable version. That means this Aggregate Service Profile 56 can be used to orchestrate a service and to fulfill a user request for a slice. As the slice accommodates more Service Profiles 54 (consumers of the slice instance), the Aggregate Service Profile 56 combines the requirements from multiple Service Profiles 54 and consolidates them into one profile, the Aggregate Service Profile 56, that conforms with the SST as well as all Service Profiles 54 allocated to the same slice.

Slice Allocation:

For the first step of the slice fulfilment process, a slice allocator comes into play. The allocator will decide on which slice a profile will land on or whether a new slice needs to be instantiated. The profile is defined in design time and now we need to instantiate it in run time. Now the allocator takes the Service Profile 54 and searches throughout all the currently deployed and running slices to find a slice that matches the new slice requirements. Matching algorithms depend on various variables of the requirements, the most important of which being the SST 52, the slice/service type. If a matching slice is successfully retrieved by the algorithm, this slice is reused to fulfill the new service request. Otherwise, the allocator decides a new slice needs to be deployed.

Aggregation:

At this point, the Service Profile 54 is allocated to the slice, but it is not yet executed. The next step would be to make sure the slice is well adapted to the newly added Service Profile 54. The aggregation algorithms use it to aggregate into the preexisting Service Profiles 54 that are currently operating the slice and create an Aggregate Service Profile 54 that combines all requirements of all Service Profiles 54 allocated to this slice. At the same time, all the individual Service Profiles 54 are maintained in the slice. However, these definitions are not actually what are used to orchestrate. They are not executable. Only Aggregate Service Profiles 56 are allowed to be instantiated. This is important to make sure the slice accommodates all the Service Profiles 54, each of which is represented by one service spec. By this aggregation we reach slice optimization. If the slice contains only one Service Profile 54, then we are creating the service but if there are subsequent ones then we are just modifying the service. At the same time by keeping references to all Service Profiles 54, we maintain a history for all the changes that occurred on the slice. That means the slice has a record of all separate requirements that control the slice. Terminating a service within a slice will therefore be easy. The Aggregate Service Profile 56 will be recalibrated to remove the reference to the Service Profile 54 of the terminated service and the slice will be adjusted accordingly.

Moreover, the inheritance relationship between each Service Profiles 54 and the parent SST of the catalog 5G super slice will guarantee that the running service will remain within the constraints of the catalog, no matter how many Service Profiles 54 were assigned to the slice and contributed by aggregation to its modification.

Figure 4:
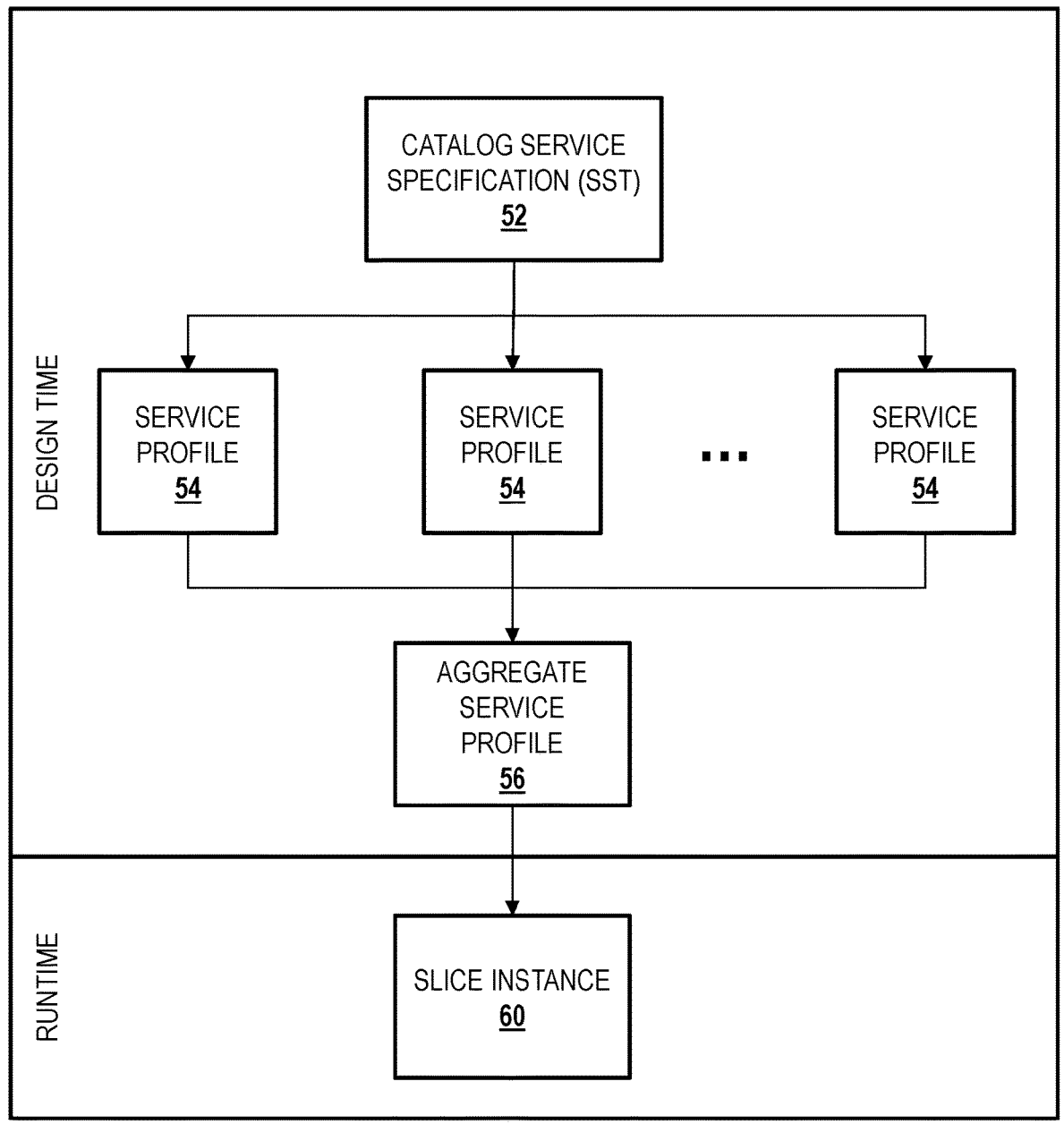
FIG. 4 is a block diagram of the relationships between Service Profiles, the Aggregate Service Profile, and a slice instance.

FIG. 4 is a block diagram of the relationships between Service Profiles 54, the Aggregate Service Profile 56, and a slice instance 60. This approach provides a single control mechanism to the underlying slice instance 60.

Example

To help better understand the concept, we can consider the scenario where a Gaming slice is running. Characteristics of this slice are mostly those around low latency features. Now, imagine the case where a new Service Profile 54 is created requesting a video conference slice, which again requires low latency characteristics of the network.

To fulfill this slice, we have three options:
(1) Create a new slice dedicated to video conferencing only. As a result, the network will have two very similar slices created, network resources are not fully utilized, and redundant resources are used. None of the two slices have reached their full capacity. Accordingly, service costs are high.
(2) Use the same gaming slice without our optimization techniques described herein. Here, network resources are reused. We have eliminated redundancy. However, the quality of service for each of the two use cases cannot always be guaranteed. Running the two use cases in parallel (gaming and video conference) can result in compromising the quality, one use case will run at the cost of the other. The slice is operating above its capacity.
(3) Applying the concepts described herein. Here the SST 52 is the low latency, whereas the first Service Profile 54 is the Gaming while the second Service Profile 54 is the Video Conference. Identifying and allocating the gaming slice as a similar low latency slice that can be reused for video conferencing. Optimizing the slice characteristics to make sure that at any given time the slice can accommodate both use cases without compromising any of the SLA requirements of each of the Service Profiles 54. That means adjusting the executable Aggregate Service Profile 56 of the slice to handle video conferencing as well. Executing the Aggregate Service Profile 56 after its modification will result in slightly modifying the slice characteristics to make sure its optimized and tailored towards the two use cases.

Zero-Touch Slicing

This behavior is a cornerstone of Zero-touch Slicing, since the fulfillment of every new request guarantees past commitments (previous Profiles), hence minimal scale up. Moreover, the retirement of a Service Profile 54 can be fully revertive, hence maximum scale down. Moreover, the control and revertive aspect of this system is an important foundational step towards effective closed loop.

Hence, key outcomes are:

Control: Inheritance of all requirements as well as Aggregate to the same SST Service Specification (template), controls the boundaries the SLA of the slice across its lifecycle while accommodating all optimization cycles. This allows dynamically allocating slices to be reused for slice requests with similar profile requirements, dynamically modify the slice's internal characteristic to optimize the resources usage while avoiding fragmentation overtime, and aggregating service profiles and consolidating them into one executable profile that will be used to create and/or modify the slice.

Optimization: Persistence of the profiles in their initial Intent content, while maintaining aggregation relationship with the executable Aggregate Service Profile 56, allows for continuous adjustments to slice instance 60. There is a maintained reference to all Service Profiles 54 that contribute to the slice's current profile as a way to keep history and allowing for easy roll back in the event where a certain Service Profile 54 is no longer needed.

Revertive Scaling: While continuously allowing slice instance 60 to accommodate additional consumer Profiles and scale up optimally in this direction, this concept is crucial for scale down. This is usually the biggest challenge allowing the recovering maximum capacity from the network. Hence being fully revertive by having a clear view into the dis-aggregated constructs of the executable Aggregate Service Profile 56 unleashes this potential.

As more services use the slice it will be essential to have aggregate design to modify the slice appropriately. Such concept makes it one step closer to zero touch slicing.

Process

Figure 5:
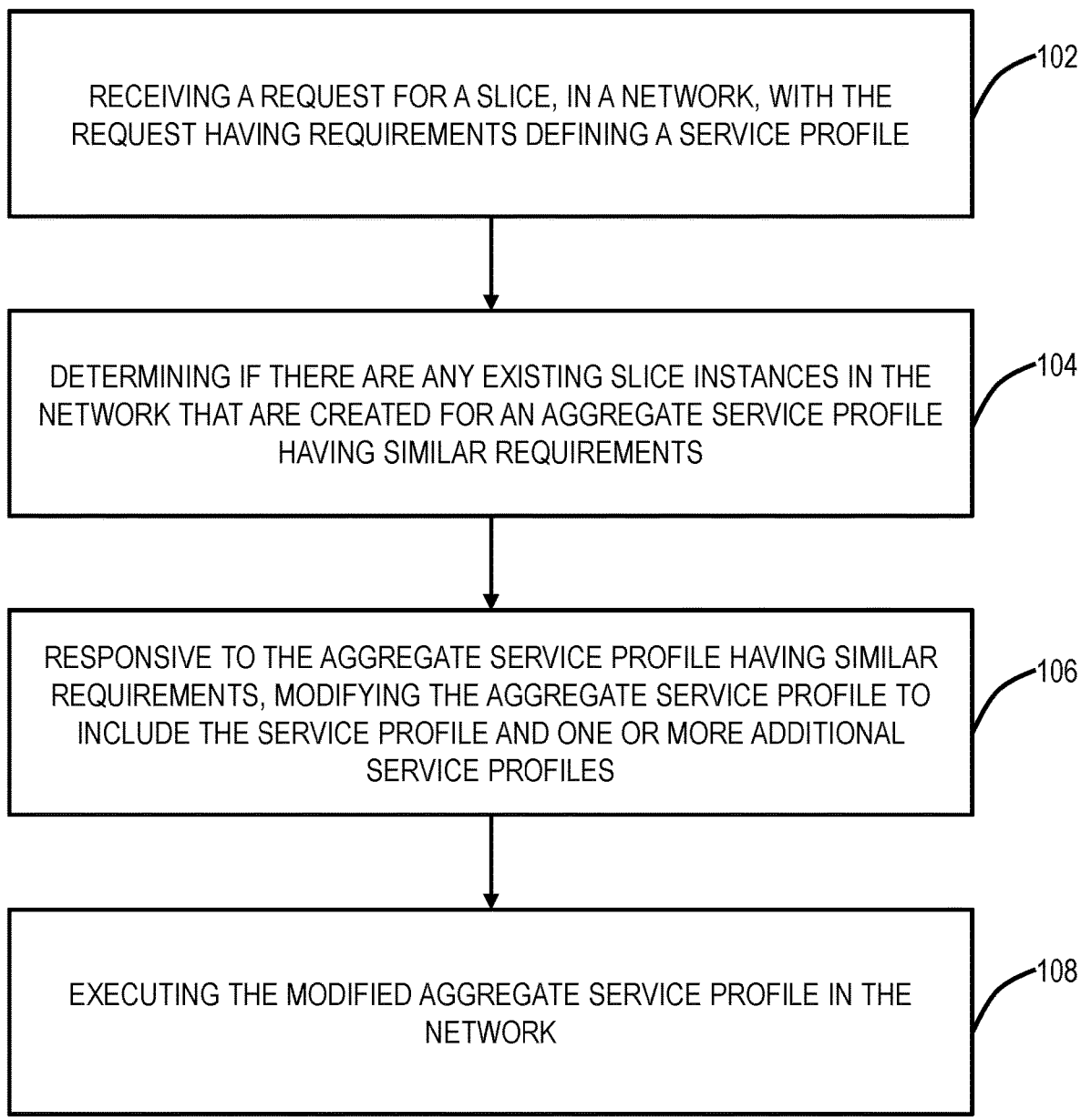
FIG. 5 is a flowchart of a process for optimizing network slices using profile specific aggregation.

FIG. 5 is a flowchart of a process 100 for optimizing network slices using service profile aggregation. The process 100 contemplates implementation as a method having steps, via a processing device having one or more processors and memory with instructions that cause the one or more processors to implement the steps, and as instructions for the steps stored in a non-transitory computer-readable medium. The process 100 can also be implemented by a network management system, Software Defined Networking (SDN) controller or application, orchestrator, off-box software, etc.

The process 100 includes receiving a request for a slice, in a network, with the request having requirements defining a Service Profile (step 102); determining if there are any existing slice instances in the network that are created for an Aggregate Service Profile having similar requirements (step 104); responsive to the Aggregate Service Profile having similar requirements, modifying the Aggregate Service Profile to include the Service Profile and one or more additional Service Profiles (step 106); and executing the modified Aggregate Service Profile in the network (step 108).

The process 100 can further include, responsive to having no existing slice instances in the network that are created for an Aggregate Service Profile having similar requirements, creating a new Aggregate Service Profile; and instantiating the new Aggregate Service Profile in the network.

The process 100 can further include determining service requirements for a slice instance associated with the Aggregate Service Profile in the network require remediation; and modifying the Aggregate Service Profile.

The process 100 can further include, responsive to a request to remove an existing service in the Aggregate Service Profile, removing a Service Profile associated with the existing service; modifying the Aggregate Service Profile with the Service Profile removed; and executing the modified Aggregate Service Profile in the network.

All Service Profiles consolidated in the Aggregate Service Profile can have a same Standard Slice Template. The similar requirements can be based on a Standard Slice Template. The requirements can include any of latency, bandwidth, and a combination thereof. The Aggregate Service Profile combines the requirements from multiple Service Profiles and consolidates them into one Profile that conforms with a Standard Slice Template as well as the multiple Service Profiles allocated therein.

Processing Apparatus

Figure 6:
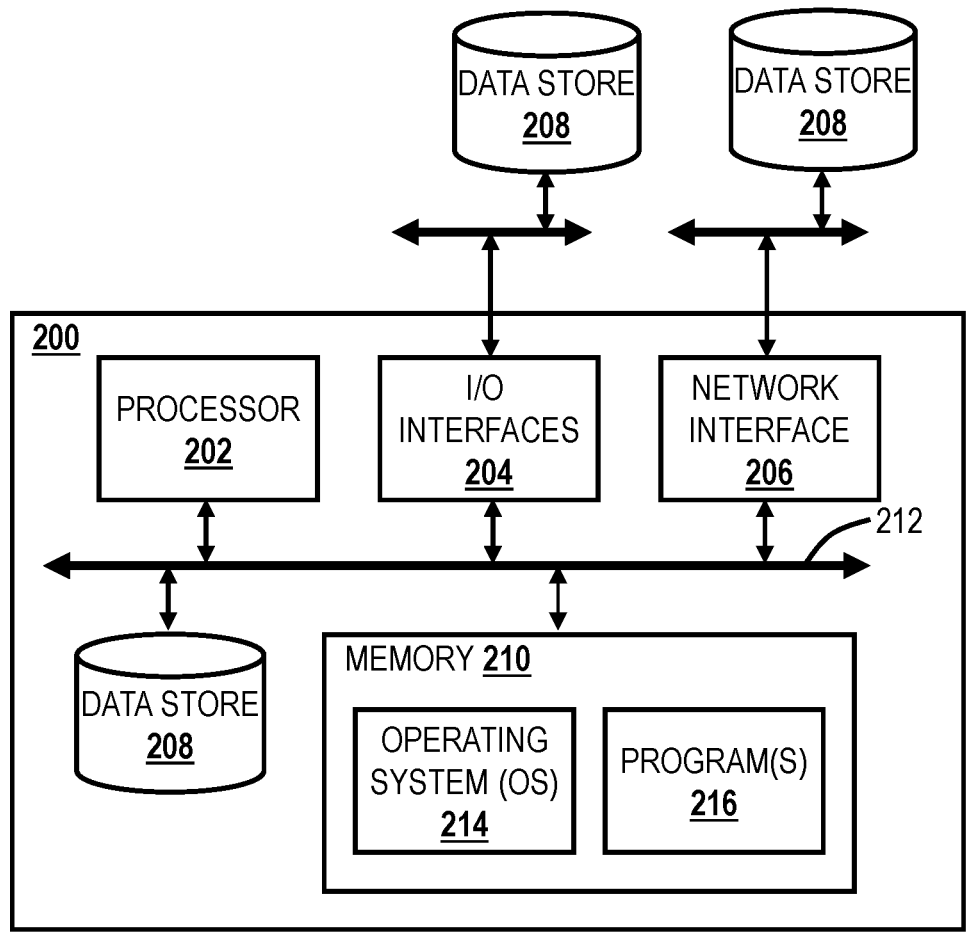
FIG. 6 is a block diagram of a processing apparatus which may be used to realize the orchestrator, and/or other systems.

FIG. 6 is a block diagram of a processing apparatus 200 which may be used to realize the orchestrator 14, and/or other systems. The apparatus 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the apparatus 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the apparatus 200, a semiconductor-based microprocessor (in the form of a microchip or chipset), or generally any device for executing software instructions. When the apparatus 200 is in operation, the processor 202 is configured to execute software stored within the memory 210, to communicate data to and from the memory 210, and to generally control operations of the apparatus 200 pursuant to the software instructions. The I/O interfaces 204 may be used to receive user input from and/or for providing system output to one or more devices or components. The user input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the apparatus 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (W LAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the apparatus 200 such as, for example, an internal hard drive connected to the local interface 212 in the apparatus 200. Additionally, in another embodiment, the data store 208 may be located external to the apparatus 200 such as, for example, an external hard drive connected to the I/O interfaces 204 (e.g., SCSI or USB connection). In a further embodiment, the data store 208 may be connected to the apparatus 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause one or more processors to perform the steps of:
    receiving a request for a slice, in a network, with the request having requirements defining a Service Profile;
    determining if there are any existing slice instances in the network that are created for an Aggregate Service Profile having similar requirements and having remaining capacity based on monitoring thereof;
    responsive to the Aggregate Service Profile having similar requirements and the remaining capacity, modifying via adjustments to slice characteristics the Aggregate Service Profile to include the Service Profile and one or more additional Service Profiles ensuring Service Layer Agreement (SLA) requirements are supported for the Service Profile and the one or more additional Service Profiles with the remaining capacity; and
    executing the modified Aggregate Service Profile in the network.

2. The non-transitory computer-readable medium of claim 1, wherein the steps further include
    responsive to having no existing slice instances in the network that are created for an Aggregate Service Profile having similar requirements, creating a new Aggregate Service Profile; and
    executing the new Aggregate Service Profile in the network.

3. The non-transitory computer-readable medium of claim 1, wherein the steps further include
    determining service requirements for a slice instance associated with the Aggregate Service Profile in the network require remediation; and
    modifying the Aggregate Service Profile.

4. The non-transitory computer-readable medium of claim 1, wherein the steps further include
    responsive to a request to remove an existing service in the Aggregate Service Profile, removing a Service Profile associated with the existing service;
    modifying the Aggregate Service Profile with the Service Profile removed; and
    executing the modified Aggregate Service Profile in the network.

5. The non-transitory computer-readable medium of claim 1, wherein all Service Profiles consolidated in the Aggregate Service Profile have a same Standard Slice Template.

6. The non-transitory computer-readable medium of claim 1, wherein the similar requirements are based on a combination of a Standard Slice Template defining at least one SLA boundary and user specific requirements.

7. The non-transitory computer-readable medium of claim 1, wherein the similar requirements for the Aggregate Service Profile include any of latency, bandwidth, and a combination thereof.

8. The non-transitory computer-readable medium of claim 1, wherein the Aggregate Service Profile combines the requirements from multiple Service Profiles and consolidates them into one Profile that conforms with a Standard Slice Template as well as the multiple Service Profiles allocated therein.

9. A method comprising steps of:
    receiving a request for a slice, in a network, with the request having requirements defining a Service Profile;
    determining if there are any existing slice instances in the network that are created for an Aggregate Service Profile having similar requirements and having remaining capacity based on monitoring thereof;
    responsive to the Aggregate Service Profile having similar requirements and the remaining capacity, modifying via adjustments to slice characteristics the Aggregate Service Profile to include the Service Profile and one or more additional Service Profiles ensuring Service Layer Agreement (SLA) requirements are supported for the Service Profile and the one or more additional Service Profiles with the remaining capacity; and executing the modified Aggregate Service Profile in the network.

10. The method of claim 9, wherein the steps further include responsive to having no existing slice instances in the network that are created for an Aggregate Service Profile having similar requirements, creating a new Aggregate Service Profile; and executing the new Aggregate Service Profile in the network.

11. The method of claim 9, wherein the steps further include determining service requirements for a slice instance associated with the Aggregate Service Profile in the network require remediation; and modifying the Aggregate Service Profile.

12. The method of claim 9, wherein the steps further include responsive to a request to remove an existing service in the Aggregate Service Profile, removing a Service Profile associated with the existing service;

modifying the Aggregate Service Profile with the Service Profile removed; and executing the modified Aggregate Service Profile in the network.

13. The method of claim 9, wherein all Service Profiles consolidated in the Aggregate Service Profile have a same Standard Slice Template.

14. The method of claim 9, wherein the similar requirements are based on a combination of a Standard Slice Template and user specific requirements.

15. The method of claim 9, wherein the similar requirements include any of latency, bandwidth, and a combination thereof.

16. The method of claim 9, wherein the Aggregate Service Profile combines the requirements from multiple Service Profiles and consolidates them into one Profile that conforms with a Standard Slice Template as well as the multiple Service Profiles allocated therein.

17. An apparatus comprising:

one or more processors and memory comprising instructions that, when executed, cause the one or more processors to receive a request for a slice, in a network, with the request having requirements defining a Service Profile, determine if there are any existing slice instances in the network that are created for an Aggregate Service Profile having similar requirements and having remaining capacity based on monitoring thereof, responsive to the Aggregate Service Profile having similar requirements and the remaining capacity, modifying via adjustments to slice characteristics the Aggregate Service Profile to include the Service Profile and one or more additional Service Profiles ensuring Service Layer Agreement (SLA) requirements are supported for the Service Profile and the one or more additional Service Profiles with the remaining capacity; and cause execution of the modified Aggregate Service Profile in the network.

18. The apparatus of claim 17, wherein the instructions that, when executed, further cause the one or more processors to responsive to having no existing slice instances in the network that are created for an Aggregate Service Profile having similar requirements, create a new Aggregate Service Profile, and cause execution of the new Aggregate Service Profile in the network.

19. The apparatus of claim 17, wherein the instructions that, when executed, further cause the one or more processors to determine service requirements for a slice instance associated with the Aggregate Service Profile in the network require remediation, and modify the Aggregate Service Profile.

20. The apparatus of claim 17, wherein the instructions that, when executed, further cause the one or more processors to responsive to a request to remove an existing service in the Aggregate Service Profile, remove a Service Profile associated with the existing service, modify the Aggregate Service Profile with the Service Profile removed, and cause execution of the modified Aggregate Service Profile in the network.

\* \* \* \* \*